(No Model.)
W. H. CARBAUGH.
DINNER PAIL.
No. 291,680. Patented Jan. 8, 1884.
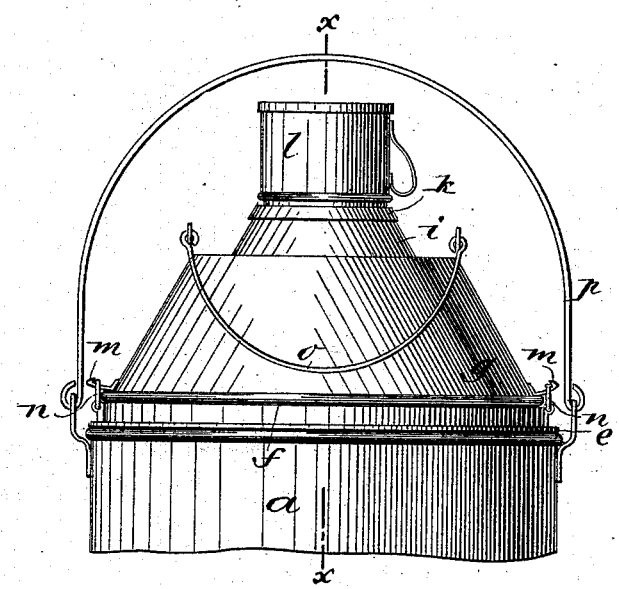
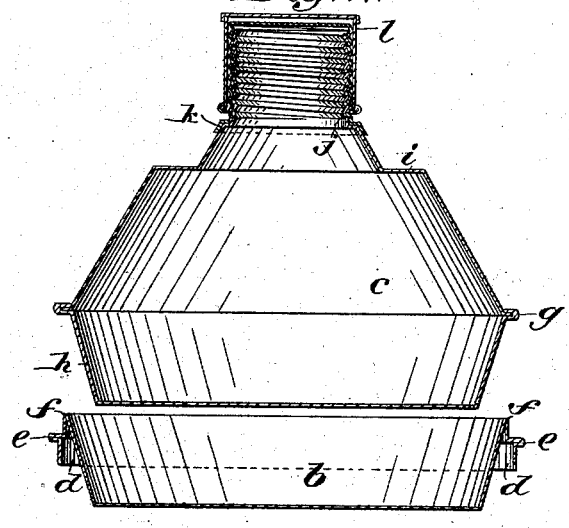
WITNESSES:
INVENTOR:
W. H. Carbaugh
BY
ATTORNEYS.

UNITED STATES PATENT OFFICE.

WILLIAM HENRY CARBAUGH, OF COLUMBUS, OHIO.

DINNER-PAIL.

SPECIFICATION forming part of Letters Patent No. 291,680, dated January 8, 1884.

Application filed October 27, 1883. (No model.)

*To all whom it may concern:*

Be it known that I, WILLIAM H. CARBAUGH, of Columbus, in the county of Franklin and State of Ohio, have invented a new and Improved Dinner-Pail, of which the following is a full, clear, and exact description.

The object of the invention is to improve dinner-pails, as hereinafter described, and pointed out in the claims.

Reference is to be had to the accompanying drawings, forming part of this specification, in which similar letters of reference indicate corresponding parts in both the figures.

Figure 1 is a side elevation of the upper portions of my improved dinner-pail, and Fig. 2 is a section of the same with the parts raised one above the other and shown separately.

I make the cover of the pail $a$ to consist of two parts, one being the pan $b$ and the other the coffee-pot $c$. The pan has a flange, $d$, fitting inside of the top of the pail, so that the pan rests on the top of the pail by the rib $e$, and the pan extends above rib $e$ a suitable distance to the top $f$, whereon the pot $c$ rests by its rib $g$ at the top of the base $h$, which is tapered to correspond with the form of the pan and sufficiently smaller than the pan to sit therein. From the rim $g$ upward the pot tapers to the top $i$, on which there is a screw-threaded nozzle, $j$, to receive a screw-cap, $k$, and over the cap I place a drinking-cup, $l$. Above the rim $g$ of the coffee-pot I attach a couple of hook-catches, $m$, and I attach the links $n$ to the top of the pan, to swing onto said catches to fasten the pan and the coffee-pot together, so that they may be used together as the cover of the pail when it is not desired to use them separately; but when they are to be used separately the links are detached from the catch-hooks, the hooks being adapted to spring down a little by pressure on their heads, so as to release the links. Thus the coffee may be kept in a tight pot, which occupies a place on the pail, where it is in a position that is unobjectionable, and from which it may be removed from the stove for heating without leaving the pail uncovered; and the pan may be used for a disk to hold the food and for heating any portion of the same.

The pot $c$ is provided with a bail, $o$, for handling it conveniently, and the pail $a$ has the bail $p$, as usual.

The pot and pan may be cylindrical instead of tapering in the parts fitting on the top of the pail, if preferred.

The cover $k$ may be fitted to slide on the nozzle, so as to be sufficiently tight without the screw-threads, if preferred, or it may be otherwise arranged, and it is designed that the opening in the pot shall be sufficiently large to admit of the pot being easily cleaned, and so that it can be easily filled.

Having thus fully described my invention, I claim as new and desire to secure by Letters Patent—

1. The combination, with the pail $a$, of the pan $b$, turned over on a line, $f$, having below $f$ a rib, $e$, and below $e$ provided with a downward extension or flange, $d$, whereby said pan may be secured in the pail, as described.

2. The pot $c$, having catches $m$ above the rim $g$, in combination with the pan $b$, having links $n$ at its top, whereby the pot and pan may be united to form a cover, as described.

WILLIAM HENRY CARBAUGH.

Witnesses:
    ALEX. W. KRAMM,
    PH. L. BERK,
    WM. J. SAILE.